C. W. LEFLER.
WEEDER.
APPLICATION FILED MAY 24, 1921.
1,433,212.
Patented Oct. 24, 1922.
2 SHEETS—SHEET 1.
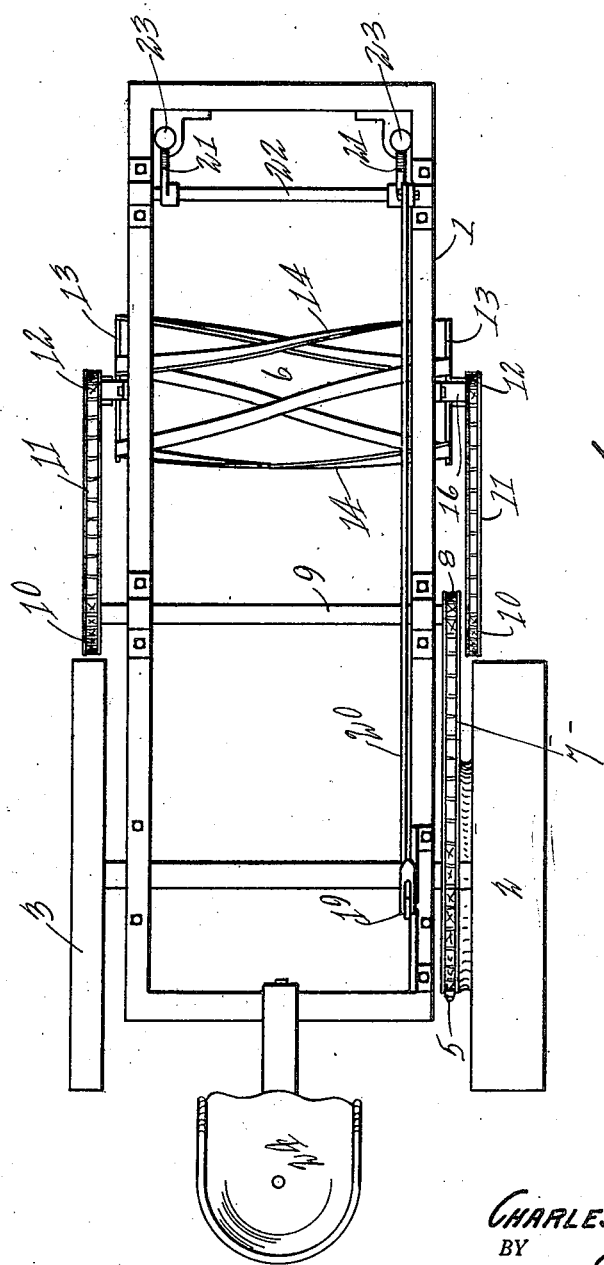
INVENTOR.
CHARLES W. LEFLER
BY
E. E. Savage
ATTORNEYS.

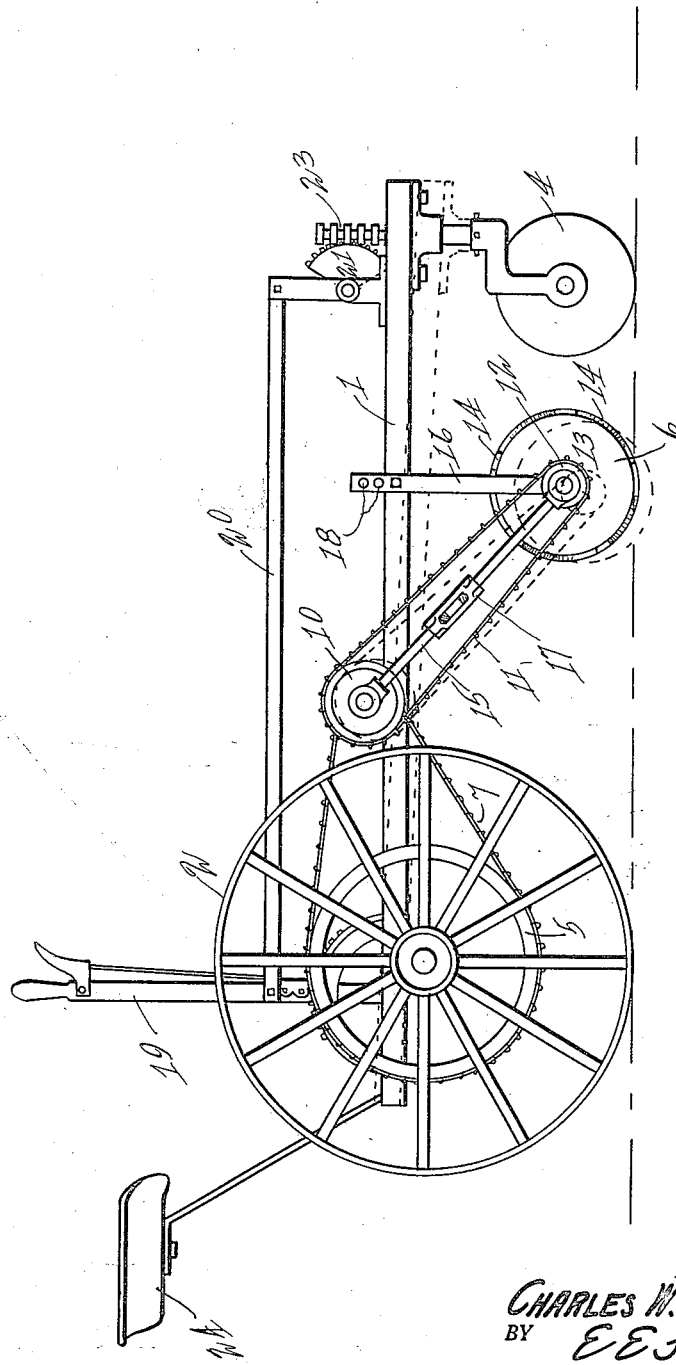

Patented Oct. 24, 1922.

1,433,212

UNITED STATES PATENT OFFICE.

CHARLES W. LEFLER, OF WALLA WALLA, WASHINGTON.

WEEDER.

Application filed May 24, 1921. Serial No. 472,064.

*To all whom it may concern:*

Be it known that I, CHARLES W. LEFLER, a citizen of the United States, residing at Walla Walla, in the county of Walla Walla and State of Washington, have invented certain new and useful Improvements in Weeders, of which the following is a specification.

This invention relates to farm machines, of a class used for ridding the soil of weeds, and has for its object to provide a means whereby a continuous cutting operation is obtained.

A further object of the invention is to provide a means whereby the smaller weeds of a field may be removed from the soil and thrown upon the surface thereof with the roots exposed to perish.

A further object of the invention is to provide a means for cutting weeds that is simple to construct, that is relatively cheap to manufacture, and that operates to work all the soil over which the machine travels.

A further object of the invention is to provide a means that will cut all weeds, and that is self cleaning due to its continuous rotation.

With these and other objects in view reference is had to the accompanying drawings in which Fig. 1 is a plan view of the device; and Fig. 2 is a side elevation thereof.

Having reference to the drawings like numerals refer to like parts throughout and the numeral 1 refers to a vehicle frame supported by the wheels 2, 3 and 4, respectively. The wheel 2 is the drive wheel and is used to drive the mechanism of the machine, and will be more fully explained; the wheel 3 is the ground wheel; the wheels 4 are caster wheels, one only of which is shown, and are used for the usual purpose of turning the machine in its travel.

The drive wheel carries a sprocket wheel 5 which operates therewith and which drives the revolving cutter 6 through the medium of the chain belt 7, sprocket 8 on the counter shaft 9, sprocket wheel 10 on the same counter shaft, chain belt 11 and sprocket wheel 12 attached to the shaft of the cutter.

The cutter 6 consists of a pair of heads 13, the periphery of which is sharpened to reduce the resistance due to entering the soil during the cutting operation. Attached to the heads and extending from one to the other thereof are spirally arranged blades 14 which are of the usual form and need no further description.

The revolving cutter is maintained in position by means of the rod 15 and the adjusting bar 16.

The rod 15 is rotatably mounted on the counter shaft at one of its ends and on the shaft of the cutter at its other end and is adjustable as to its length by means of the turn buckle 17.

The adjusting bar 16 is provided with extra bolt holes 18 by which means the heighth of the cutter with respect to the frame may be regulated, as, for instance, in the light soil with the weeds deeply set therein, the cutter would be positioned low with respect to the frame.

The cutter is manually raised or lowered during operation by the lever 19, connecting rod 20, and toothed quadrant 21 mounted on the shaft 22, the teeth of the quadrant engaging the grooves in the stem 23 of the caster wheels 4.

It will now be seen that by operating the lever rearwardly the frame 1 is lowered and with it the cutter, thus regulating the cutter to a predetermined depth in the soil. The cutting depth is plainly shown by the dotted lines in Fig. 2.

A seat 24 may be attached to the frame if desired.

In use the machine will travel over the field and the cutter, which rotates with greater velocity than the travel of the machine due to the gearing, slices off the earth as it is encountered, and by means of the spiral arrangement of the blades a shearing effect is produced which cuts the larger weeds and pulls out and destroys the smaller ones.

Obviously the cutter may be as wide as required by widening the frame, and as it is carried by wheels will require a minimum of power for operation.

After the work is done the cutter may be raised and the machine removed from the field with ease.

I do not wish to restrict myself to a single speed of the cutter and hence may apply two sprocket wheels on a feather key on the counter shaft in place of the single sprocket wheel 8, and by shifting from one to the other obtain a different speed. This means for changing speed being old in the art it is deemed unnecessary to show it in the drawings or to further describe it.

Having thus described my invention, I claim—

In a weeder, the combination with a vehicle frame, drive wheels, and a revolving cutter operably attached to said frame, of an adjusting bar adjustably attached to said frame and supporting said cutter, an adjustable rod maintaining said cutter in proper register with its driving mechanism, and means to raise or lower said frame and with it said cutter, said means consisting of caster wheels disposed ahead of said driving wheels and provided with grooved stems and a toothed quadrant engaging said stems and operable by means of an operating lever.

In testimony whereof I affix my signature.

CHARLES W. LEFLER.